United States Patent
Yoshida et al.

(10) Patent No.: US 6,301,620 B1
(45) Date of Patent: Oct. 9, 2001

(54) METHOD OF SENDING DATA FROM SERVER COMPUTER, STORAGE MEDIUM, AND SERVER COMPUTER

(75) Inventors: Yasuhiro Yoshida; Keiji Okamoto, both of Osaka-fu (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/038,730

(22) Filed: Mar. 11, 1998

(30) Foreign Application Priority Data

Mar. 11, 1997 (JP) .................................. 9-056211

(51) Int. Cl.$^7$ ............................ G06F 15/16; G06F 13/38
(52) U.S. Cl. ............................................ 709/235; 370/229
(58) Field of Search ................................. 709/224, 232, 709/233, 234, 235; 370/232, 445; 365/49

(56) References Cited

U.S. PATENT DOCUMENTS

| | | | |
|---|---|---|---|
| 5,020,020 | * 5/1991 | Pomfret et al. | 709/235 |
| 5,235,595 | * 8/1993 | O'Dowd | 370/94 |
| 5,432,907 | 7/1995 | Picazo, Jr. et al. | |
| 5,495,589 | 2/1996 | Mackenthun et al. | |
| 5,561,805 | * 10/1996 | Bruck et al. | 395/800 |
| 5,588,151 | * 12/1996 | Segal et al. | 709/235 |
| 5,600,793 | 2/1997 | Nord | |
| 5,613,003 | 3/1997 | Bridgewater et al. | |
| 5,737,635 | * 4/1998 | Daines et al. | 709/232 |
| 5,828,653 | * 10/1998 | Goss | 370/230 |
| 5,835,484 | * 11/1998 | Yamato et al. | 370/230 |
| 5,901,140 | * 5/1999 | Van As et al. | 370/236 |
| 5,923,655 | * 7/1999 | Veschi et al. | 370/394 |
| 5,982,778 | * 11/1999 | Mangin et al. | 370/445 |
| 5,995,488 | * 11/1999 | Kalkunte et al. | 370/232 |
| 5,999,434 | * 12/1999 | Yoneda et al. | 365/49 |

FOREIGN PATENT DOCUMENTS

| | | |
|---|---|---|
| 5-265979 | 10/1993 | (JP) . |
| 5-342173 | 12/1993 | (JP) . |
| 7-110798 | 4/1995 | (JP) . |

\* cited by examiner

*Primary Examiner*—Mark H. Rinehart
*Assistant Examiner*—B. Jaroenchonwanit
(74) *Attorney, Agent, or Firm*—McDermott, Will & Emery

(57) ABSTRACT

A server computer 11 in a data transmission system receives data processing demand packets sent in from any of a plurality of terminal computers on the network via a specific terminal port on the switching hub, and a group of sending data packets is formed against the data processing demand packets and at the same time this sending data packet group is sent, via the specific terminal port, to the terminal computer 12 that sent out the data processing demand packet. The terminal port manager first finds out, on the basis of the information contained in the data processing demand packet, the number of the terminal port on the switching hub 13 to which the terminal computer, the destination of the sending data packet group, is connected; a terminal port number checker then checks the terminal port numbers found out by the terminal port manager if the terminal port numbers for sending data packets formed on the basis of consecutively received processing demand packets are the same; and then an output regulator adjusts the time of sending out the second sending data packet unit for the data processing demand packet if the two consecutive terminal port numbers are found identical by the terminal port checker. This way, the possibility is precluded that there will be a rush of sending data packets to the same terminal port.

13 Claims, 15 Drawing Sheets

FIG. 3

| Terminal Port Number (n) on switching hub | Terminal computer address |
|---|---|
| a | Computer 12-1 |
| a | Computer 12-2 |
| a | Computer 12-3 |
| b | Computer 12-4 |
| c | Computer 12-5 |
| ⋮ | ⋮ |

1107: Terminal port number controller

FIG. 4(a)

| | |
|---|---|
| ① | Address information |
| ② | Sender's address information |
| ③ | Data reading out demand information |
| ④ | File number |
| ⑤ | Address of data to be read out |
| ⑥ | Data size |

Pd0: Data processing demand packet

FIG. 4(b)

| | |
|---|---|
| ① | Address information |
| ② | Sender's address information |
| ⑦ | Packet number |
| ⑧ | Address of data to be read out |
| ⑥ | Data size |
| ⑨ | Terminal port number storage area |

Ps0: "sending" demand packet

FIG. 17(a)

| | |
|---|---|
| ① | Address information of server |
| ② | Sender's address information |
| ③ | Data reading out demand information |
| ④ | File number |
| ⑤ | Address data to be read |
| ⑥ | Data size |

Pd1: Data processing demand packet

FIG. 17(b)

| | |
|---|---|
| ① | address information |
| ② | Sender's address information |
| ⑦ | Packet number |
| ⑧ | Address data to be read |
| ⑤ | Data size |

Ps1: "sending" demand packet

METHOD OF SENDING DATA FROM SERVER COMPUTER, STORAGE MEDIUM, AND SERVER COMPUTER

FIELD OF THE INVENTION

The present invention relates to a method of transmitting data from a server computer and the server computer, more particularly a method of transmitting data from a server computer incorporated in a data transmission system and the server computer.

BACKGROUND OF THE INVENTION

The prior art data transmission system using a server computer is outlined in a block diagram in FIG. 14.

In the prior art system, a plurality of terminal computers 12 are connected to a server computer 11 via switching hub 13 with a packet switching function, and upon demand from a terminal computer 12, the server computer 11 transmits the wanted data to the terminal computer that sent in the demand.

The prior art network data transmitter is illustrated in further detail in FIG. 15. The server computer 11 is provided with k units of cards 130. each comprising a local CPU 131(k) and a local memory 132(k) as well as a port correspoonding to a local disk 133(k); k units of send-only ports Ps1(k), one for each card 130(k); and one receive-only port Pr1. The suffix k in parentheses indicates the cardnumber and is an integer (in the case of FIG. 15, an integer of 0 to 7).

The switching hub 13 is equipped with k units of ports Ps2(k) as opposed to the aforesaid send-only ports Ps1(k) on the server computer and a port Pr2 opposite to the above-mentioned receive-only port Pr1 also on the server computer 11 as well as a plurality of ports p(a) to p(c) for the terminal computers 12 (in the case of FIG. 15, 3 terminal ports). To each of the terminal ports p(a) to p(c) can be connected one or more terminal computers 12. In FIG. 15, three units of terminal computers 12-1 to 12-3 are connected to the terminal port p(a), and one terminal computer 12-4 to the terminal port p(b) and one 12-5 to the terminal port p(c) respectively.

The local disks 133(k) on the aforesaid server computer combined forms a logical storage area. Physically, one data is fragmented in blocks of, say one kilobyte, and stored there.

FIG. 16 is a functional block diagram showing the configuration of the server computer in still more detail. The operating process of the prior art system will now be described further elaborately, referring to the figure.

If the terminal computer 12-1 sends in a data processing demand packet Pd1 as shown in FIG. 17(*a*), for example, the packet is transmitted to the server computer 11 (the receive only port Pr1) via the terminal port p(a) and the port Pr2 on the switching hub 13. By the way, the data processing demand packet Pd1 contains the following information as shown in FIG. 17(*a*): address (server computer address) (1), sender's address (address of the terminal computer making a data processing demand) (2), data reading out demand (3), file number (4), address of data to be read out (address on the logical storage area formed by the whole local disks) (5) and data size (6). The data processing demand packet Pd0 which is received at a packet receiver 101 in the server computer is relayed to a packet processor 102 where the processing demand Pd1 is deciphered and sent on to a data processor 103.

The data processor 103 in turn instructs a data reader 105 to read out data at a specified address, the reader provided on the local CPU 131(k) in each card 130(k). According to the instructions, the data reader 105 reads out the specified data on to a local memory 132(k) from the local disk 133(k) provided in the card 130(k).

Further, the data processor 103 hands over the "sending" demand packet Ps1(k) shown in FIG. 17(*b*) to a sending data packet processor 104 in the card 130(k), and instructs the processor to incorporate the read out data into a packet. A group of sending data packets thus formed in the card 130(k) is sent out from the packet sender 106 via the port Ps1(k) provided for the card 130(k). It is noted that the "sending" demand packet Ps1(k) carries the following information as shown in FIG. 17(*b*): destination address (address of the terminal computer) (1), sender's address (address of the server computer 11) (2), packet number (7), address of the data to be read out (address of the local disk for the data to read out) (8), and data size (6).

The sending data packet thus sent out is outputted to the switching hub 13, where the packet is stored in the buffer of the port P(a) for the destination terminal computer 12-1 before being send out therefrom. The data packet outputted this way has the address written at the header, and can be taken in by the terminal computer 12-1 at that address. Receiving a group of sending data packets, the terminal computer 12-1 edits the packets of data in a proper order and uses them for the intended purpose.

The question is that there is a possibility that the size of a single sending data packet will exceed the maximum permissible volume of a packet that flows on the network. To cope with it, a plurality of data packets, say 8 sending data packets, are usually grouped into one unit. In the ethernet, the maximum permissible packet size is 1.5 kilobytes for single packets. But if a plurality of data packets are grouped into a unit, up to 8 kilobytes can be transmitted as one unit. In an example with 8 local disks, a unit of 8 kilobytes of data packets can be formed with one kilobyte allocated for each local disk 133(k).

In the foregoing system configuration, however, there arises a possibility that a plurality of sending data packet units or groups may be transmitted almost simultaneously and successively to a specific terminal port on the switching hub to which the terminal computers 12 are connected.

When processing demands happen to come almost simultaneously from terminal computers 12-1 and 12-2 both connected to the port P(a) on the switching hub 13, for example, two units of sending data packets to be received by the terminal computers 12-1 and 12-2 [(the number of packets in a send packet group)×2] will rush to the port P(a) on the switching hub 13 almost at the same time.

Also, when data processing demand packets Pd0 are sent almost simultaneously from three computers 12-1 to 12-3, for example, the switching hub 13 will have deal with the same number of sending data packets [(number of packets in a send packet group)×3] the same way.

While a buffer is provided in the terminal port p(a) on the switching hub 13, a simultaneous rush of data could exceed the capacity of the buffer. If too large a size of data rushes in the buffer, the part of the data that fails to be stored in the buffer will be discarded. That is, the units of data sent out from the server computer 11 will come in with the data for the terminal computer 12-1 or 12-2 cut off in part. That presents such problems as interrupted moving images as in a moving image data system, for example, where real time processing is required.

The present invention is proposed in view of such problems that are encountered with the prior art system. It is an object of the present invention to provide a server computer so configured that if there are simultaneous processing demands from a plurality of terminal computers connected to the switching hub, send data would not be concentrated in one terminal port on the switching hub.

SUMMARY OF THE INVENTION

To attain the object of the present invention, a number of means are adopted on a server computer 11 and system in which data processing demand packets Pd0 sent out from a plurality of terminal computers on the network are received via a specific terminal port on the switching hub, and a group of sending data packets is formed against the data processing demand packets Pd0 and then sent, via the specific port, to the terminal computers 12 that send in the data processing demand packets Pd0. In other words, the prior art server computer and the system form a basis on which the present invention is made.

Now here is a summary of the present invention: In the server computer 11, a port managing means 300 first finds out, from the information contained in the data processing demand packet Pd0, the number of the terminal port on the switching hub 13 to which the terminal computer 12, the destination of a group of sending data packets, is connected.

In the next step, a terminal port number checking means 400 checks if the terminal port number found out by the port managing means 300 is identical with that of another sending data packet unit formed in answer to another processing demand packet Pd0 received just before or after the one now being processed.

Then, if the two numbers are identical, an output regulating means 500 adjusts the time of sending out the second sending data packet unit.

The output regulating means 500 can be either a timer 1109 to regulate the time interval of sending out the sending data packet groups or a dummy inserter 1209 to insert a dummy packet between two sending data packet units.

Another possible way is that on the basis of the terminal port numbers indicated by the port managing means 300, an order altering means 800 changes the order of sending out sending data packet groups according to a specific rule in such a way that terminal port numbers of consecutive sending data packet groups will not be the same as far as possible, and the terminal port number checking means 400 is activated. This method canreduce the number of sending out dummy packets.

Still another way is to provide a processing demand packet buffer. In this method, a "sending" demand packet is formed against a data processing demand packet and the "sending" demand packet is stored on the area in the processing demand packet buffer allocated for the terminal port number found out by the port managing means 300, and then a sending data packet group is prepared on the basis of the "sending" demand packet at a sending means 600. In this case, the output regulating means 500 stores the dummy insertion demand packet in the area in the processing demand packet buffer where the "sending" demand packet is not stored. And the "sending" demand packets or the dummy insertion demand packets are taken out one by one by the sending packet processor from different areas allocated for different terminal port numbers in the processing demand packet buffer.

The sending packet processor is formed according to the said "sending" demand packet, and the said dummy packet is also formed according to the said dummy insertion packet. The dummy packet will have an address for a terminal port which does not lead to the terminal computer 12, the sender of the data processing demand.

BRIEF DESCRIPTION OF THE DRAWING

FIG. 3 is a conceptional diagram showing the storage contents in the terminal port number controller.

FIG. 4 is a conceptional diagram showing a data processing demand packet and a "sending" demand packet.

FIG. 17 is a conceptional diagram showing the prior art data processing demand packet and "sending" demand packet.

EMBODIMENT OF THE INVENTION

Figure 14:
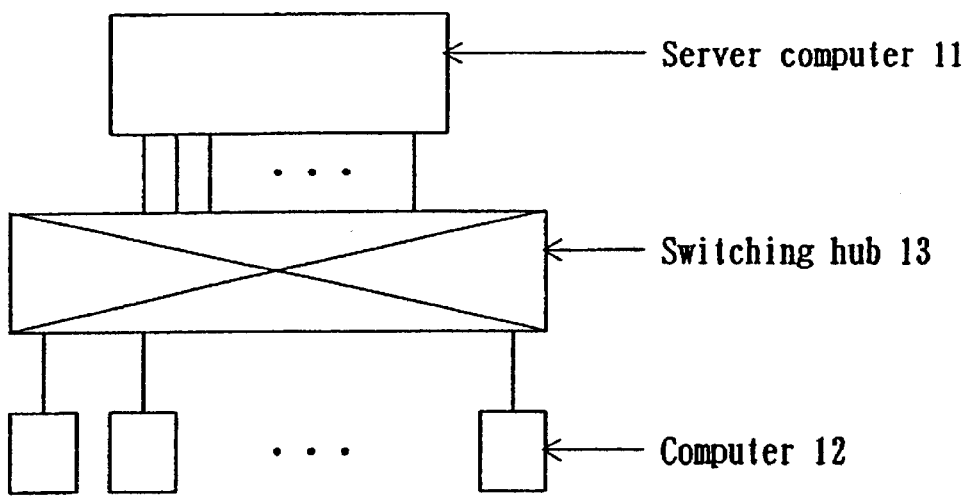
FIG. 14 is a functional block diagram showing the outline of the prior art data transmission system.
Figure 16:
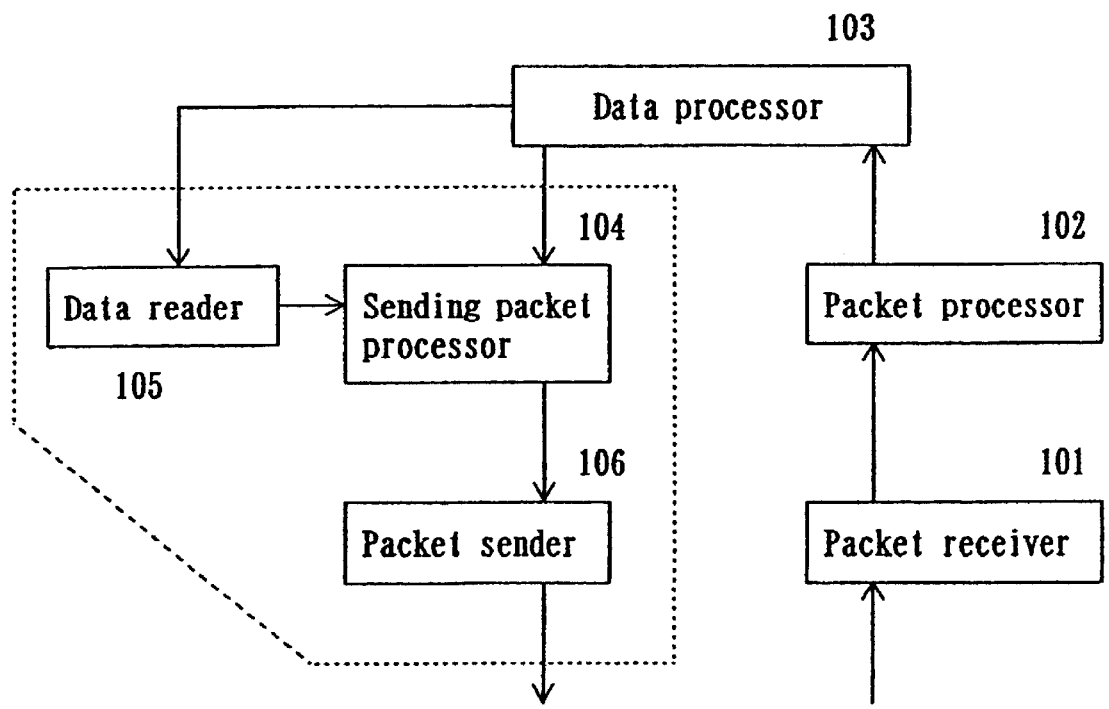
FIG. 16 is a functional block diagram showing a further detailed outline of the server computer.
Figure 15:
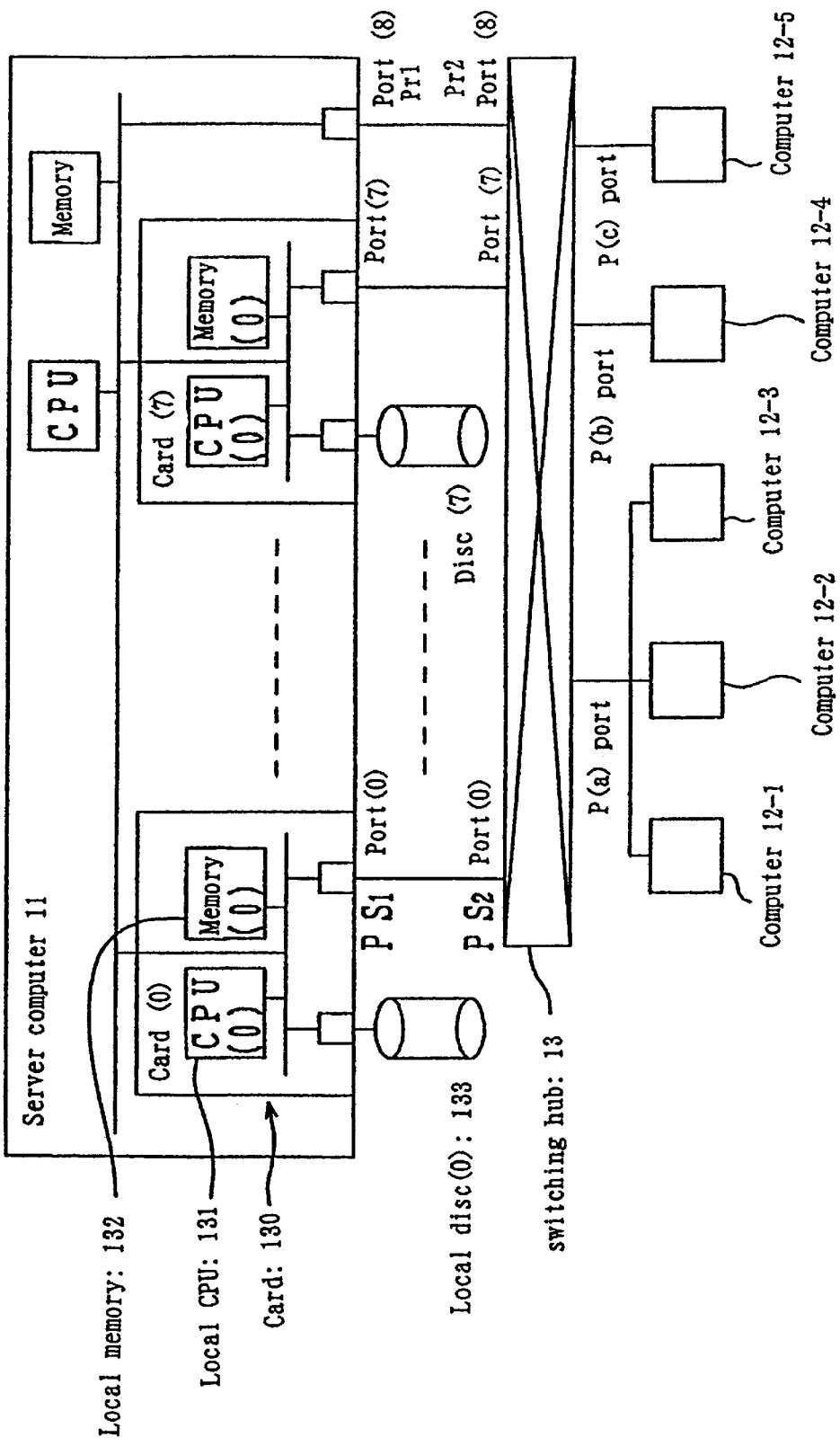
FIG. 15 is a functional block diagram showing a further detailed outline of the prior art system.

There will no detailed description of the data transmission system using the server computer to which the present invention is applied, because the basic configuration is identical with that shown in FIG. 14. In describing the present invention, the configuration shown in FIG. 15 will be used as a further detailed example of FIG. 14, but FIG. 15 has already been explained and the description thereof will be omitted in the following description.

Embodiment 1

Figure 1:
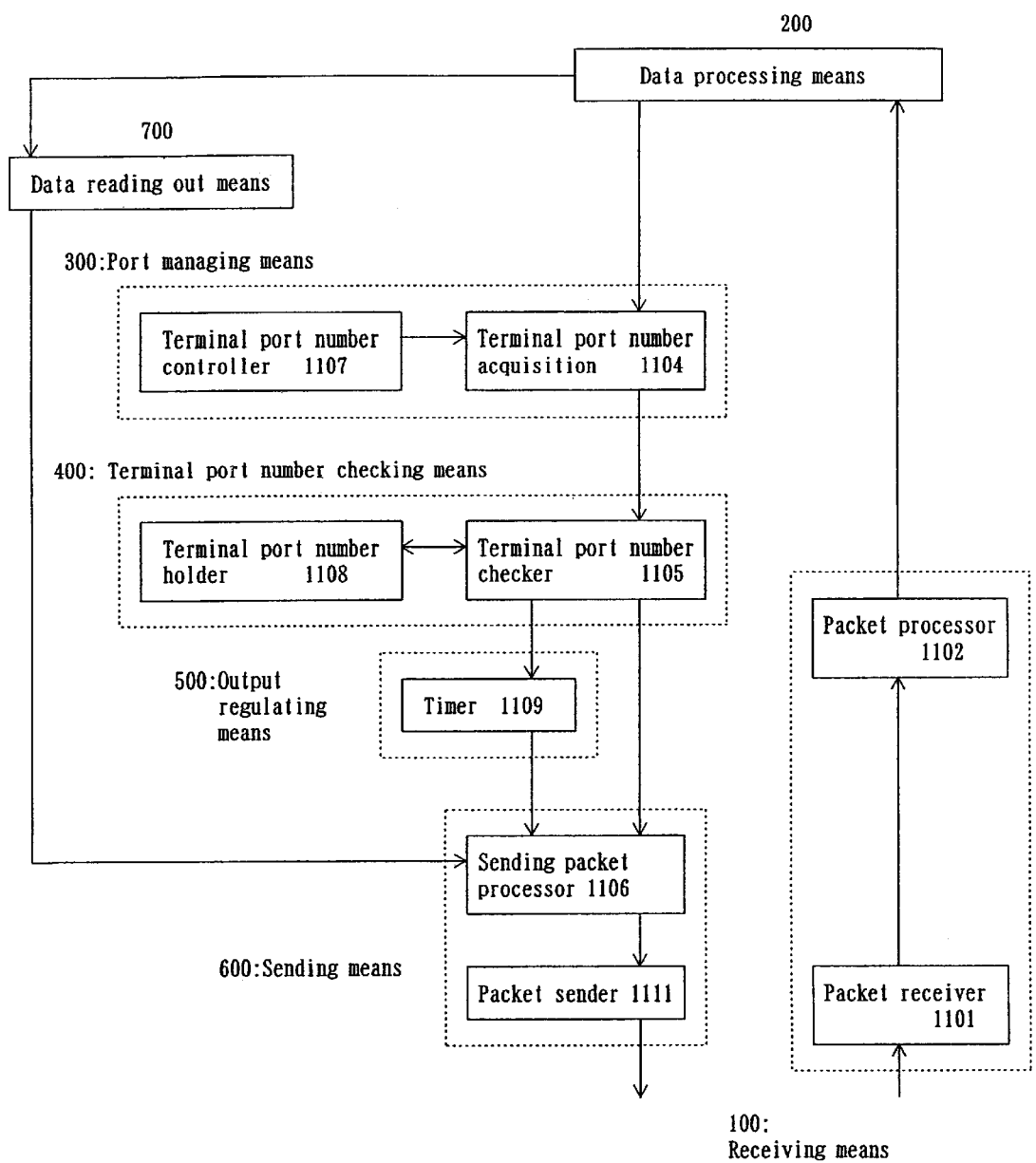
FIG. 1 is a functional block diagram showing an embodiment of the present invention.

FIG. 1 is a functional block diagram of the server computer showing an embodiment of the present invention.

The server computer 11 comprises a receiving means 100, a data processing means 200, a port managing means 300, a terminal port number checking means 400, an output regulating means 500, a sending means 600 (k) and a data reading out means 700(k). The sending means 600(k) and the data reading out means 700(k) provided in the respective cards 130(k).

The receiving means 100 comprises a packet receiver 1101 and a packet processor 1102 and is responsible for receiving the data processing demand packet Pd0 received from a terminal computer 12 as illustrated below. The data processing means 200 instructs the data reading out means 700 in the card 130(k) to read out data according to the data processing demand packet Pd0 and forms a "sending" demand packet, which is used later in subsequent data sending. The port managing means 300 comprises a terminal port number controller 1107 which memorizes terminal port numbers of terminal ports P(a) to P(c) (described P(n) in the following: P(n) in which n is a terminal port number of $a_1 \ldots$ ) on the switching hub 13 to which the respective terminal computers 12-1 to 12-5 are connected and a terminal port number acquisition 1104 which acquires terminal port numbers when receiving the "sending" demand packet from the data processing means 200, the terminal port numbers matched with the address of the destination terminal computer contained in the packet.

The terminal port number checking means 400 checks if terminal port numbers indicated by two consecutive "sending" demand packets are identical with each other. The output regulating means 500 comprises a timer 1109 which is activated when the terminal port number checking means 400 finds that the terminal ports for the two consecutive "sending" demand packets are identical. The sending means 600 comprises a sending packet processor 1106 to generate a sending data packet according to the instructions from the output regulating means 500 and a packet sender 1111. And the data reading out means 700(k) is incorporated in the local CPU 131(k) on the card 130(k) as program and reads out a specified data from a logical storage area made up of a local disk (k) on the card 130(k) according to the instruction from the data processing means 200.

Figure 2:
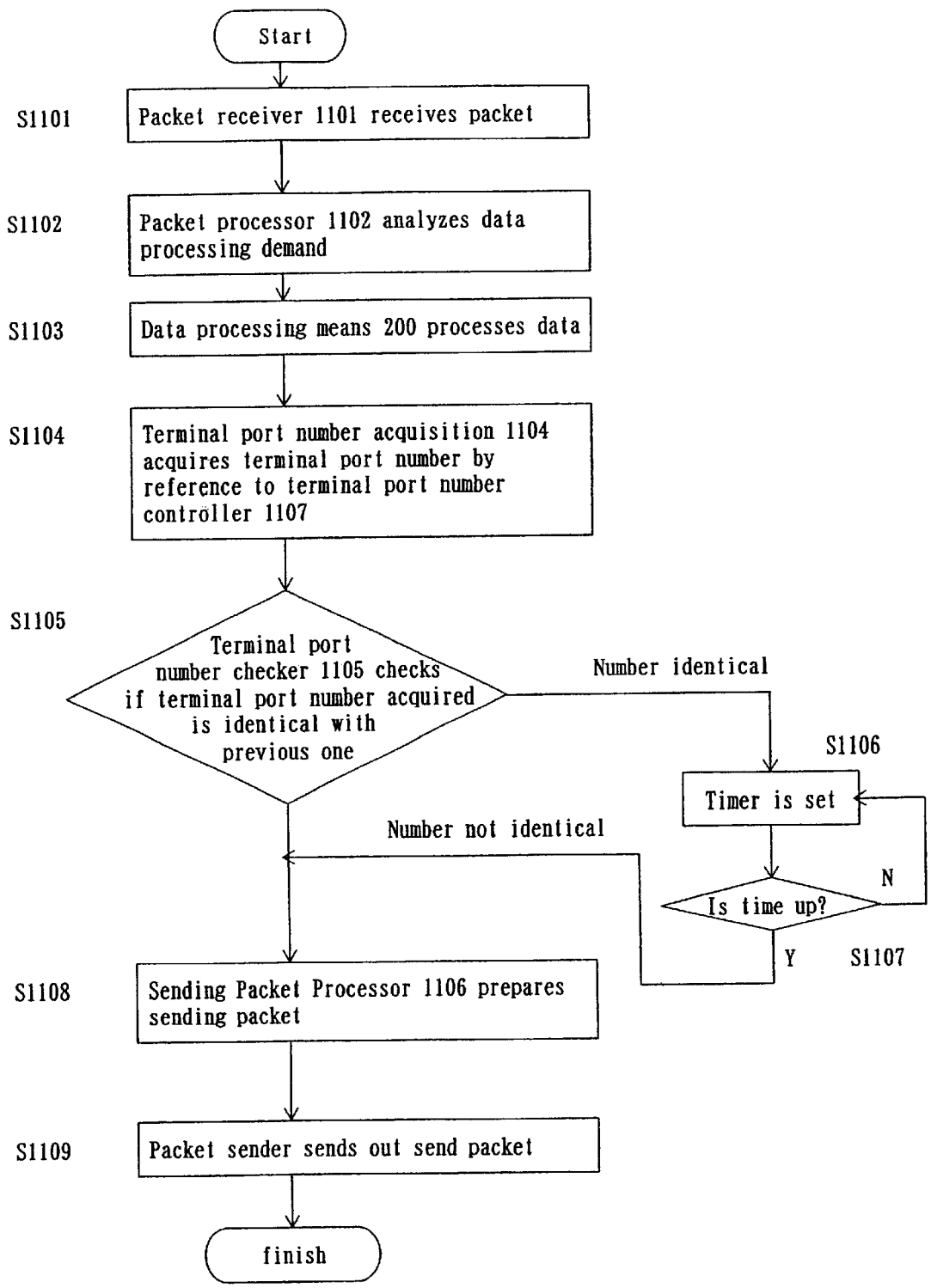
FIG. 2 is a flow chart showing the operating process of the embodiment in FIG. 1.

FIG. 2 is a flow chart showing the operating process of the server computer 11. The construction and operation of the server computer 11 will be explained hereinafter in further detail referring to FIGS. 1 and 2.

The packet receiver 1101 in the receiving means 100 receives a data processing packet Pd0 shown in FIG. 4(*a*) (identical with FIG. 17(*a*)) from the network and hands over the same to the packet processor 1102. The packet processor 1102 analyzes the contents of the received packet and refers the results to the data processing means 200 (FIG. 2. Step S 1101–S 1102–S 1103). The data processing means 200 then directs the data reading out means 700(k) incorporated in the local CPU 131(k) to read out the needed data according to the instructions in the data processing demand packet and generates a "sending" demand packet Ps0 as shown in FIG. 4(*b*) to form a sending data packet, and then forwards the same to the terminal port number acquisition 1104 in the port managing means 300 in the next step.

As is evident from FIG. 4(*b*), the "sending" demand packet Ps0 contains the following information as the prior art "sending" demand packet Ps1(k) shown in FIG. 17(*b*): destination address (addresses of the terminal computers 12-1 to 12-5) (1). sender's address (address of the server computer (11) (2), packet number (7), address on the local disk 133(k) of the data to be read out (8) and data size (6). Also carried in the packet is a terminal port number storing section (9) to store the terminal port number (n) on the switching hub to be acquired in the subsequent processing.

In the terminal port number controller 1107, the addresses of the terminal computers 12-1 to 12-5 are stored beforehand side by side with the terminal port numbers on the switching hub 12 to which the respective terminal computers are connected as shown in FIG. 3.

If, with this setup, a "sending" demand packet Ps0 is inputted in the terminal port number acquisition 1104 from the data processing means 200, the terminal port number acquisition 1104 acquires a terminal port number from among the terminal ports P(a) to P(c) matching the addresses of the terminal computers 12-1 to 12-5 written in the "sending" demand packet Ps0 as shown above and then writes in the terminal port number (n) in the terminal port number section (9) in the "sending" demand packet Ps0.

If the writing in of the terminal port number (n) is completed, the terminal port number checker 1105 in the terminal port number checking means 400 is activated. The terminal port number checker 1105 receives the "sending" demand packet Ps0 from the terminal port number acquisition 1104 and reads out the terminal port number (n), and checks the terminal port number (n) against that of the previous "sending" demand packet memorized in a terminal port number holder 1108 (FIG. 2, Step S 1104–S 1105).

If the terminal port numbers in the consecutive two "sending" demand packets Ps0 are identical, the timer 1109 as output regulating means 500 is activated (FIG. 23 Step S 1106).

The sending packet processor 1106 in the sending means 600(k) provided in each card 130(k) is activated when the switching hub terminal port number checker 1105 judges the two numbers not the same or the timer 1109 runs out, while the data reading out means 700(k) incorporated in the local CPU 131(k) in the card 130(k) reads out the corresponding data onto the local memory 132(k) according to the instructions from the data processing means 200.

The sending packet processor 1106 thus activated forms a header for the sending data packet by reference to the contents of the "sending" demand packet Ps0 and at the same acquires the necessary data from the local memory 132(k) and incorporates the same in the sending data packet. Then, the sending data packet is handed over to the packet sender 1111 and sent out on the network (FIG. 2, Step S 1108–S 1109).

In the present embodiment, if groups of sending data packets to terminal computers come in successively at one and the same terminal port P(n) on the switching hub, the sending out will be regulated to a proper time interval. That precludes the possibility that while a group of sending data packets (in the present example, 8 pieces of 1-kilobyte data packets) stored in the buffer of specific port P(n) on the switching hub 13 are still being processed, another group of sending data packets will be inputted, with the part of the data beyond the buffer capacity discarded.

Embodiment 2

Figure 5:
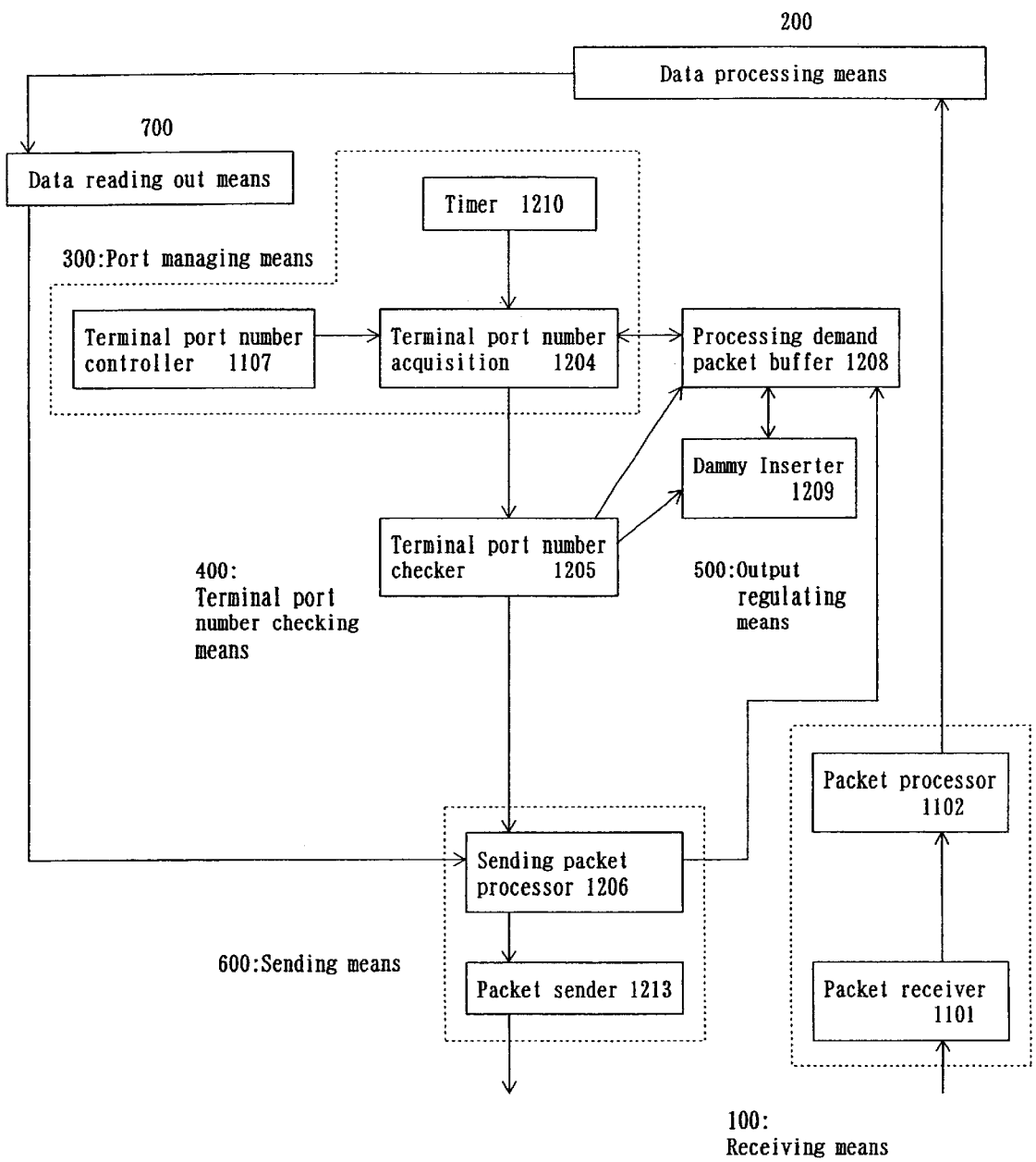
FIG. 5 is a functional block diagram showing another embodiment of the present invention.

FIG. 5 is a functional block diagram of a second embodiment of the present invention.

In the following description of the present embodiment, the same reference numbers as in FIG. 1 will be used, but no explanation Will be made of the configuration and function of the receiving means 100 (packet receiver 1101 and the packet processor 1102) and the data processing means 200 in the server computer 11. which are identical with those in Embodiment 1.

The port managing means 300 comprises, as in the configuration of Embodiment 1, a terminal port number controller 1107 which memorizes port numbers of terminal ports matched with the respective terminal computers 12-1 to 12-5 and a terminal port number acquisition 1204 which acquires terminal port numbers on the switching hub 13. In the present embodiment, the terminal port number acquisition 1204 is furthermore activated by a timer 1210 at a specific time interval.

A terminal port number checker 1205 as the terminal port number checking means 400 checks if a plurality of "sending" demand packets Ps0 stored in a processing demand packet buffer 1208 are identical with each other in terminal port number (n). The output regulating means 500 comprises a dummy inserter 1209 which is activated when the terminal port number checking means 400 judges the terminal port numbers to be the "same."

Figure 6:
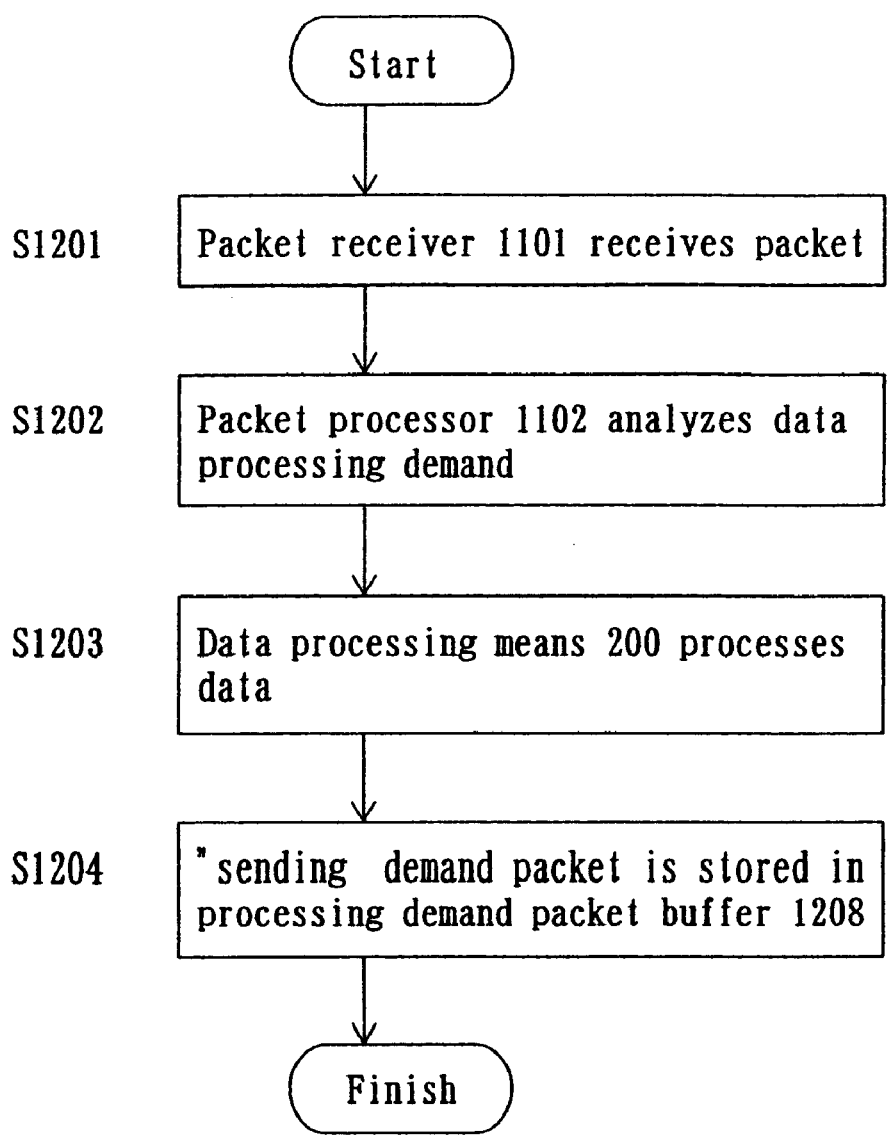
FIG. 6 is a flow chart showing an operating process of the embodiment in FIG. 5.
Figure 7:
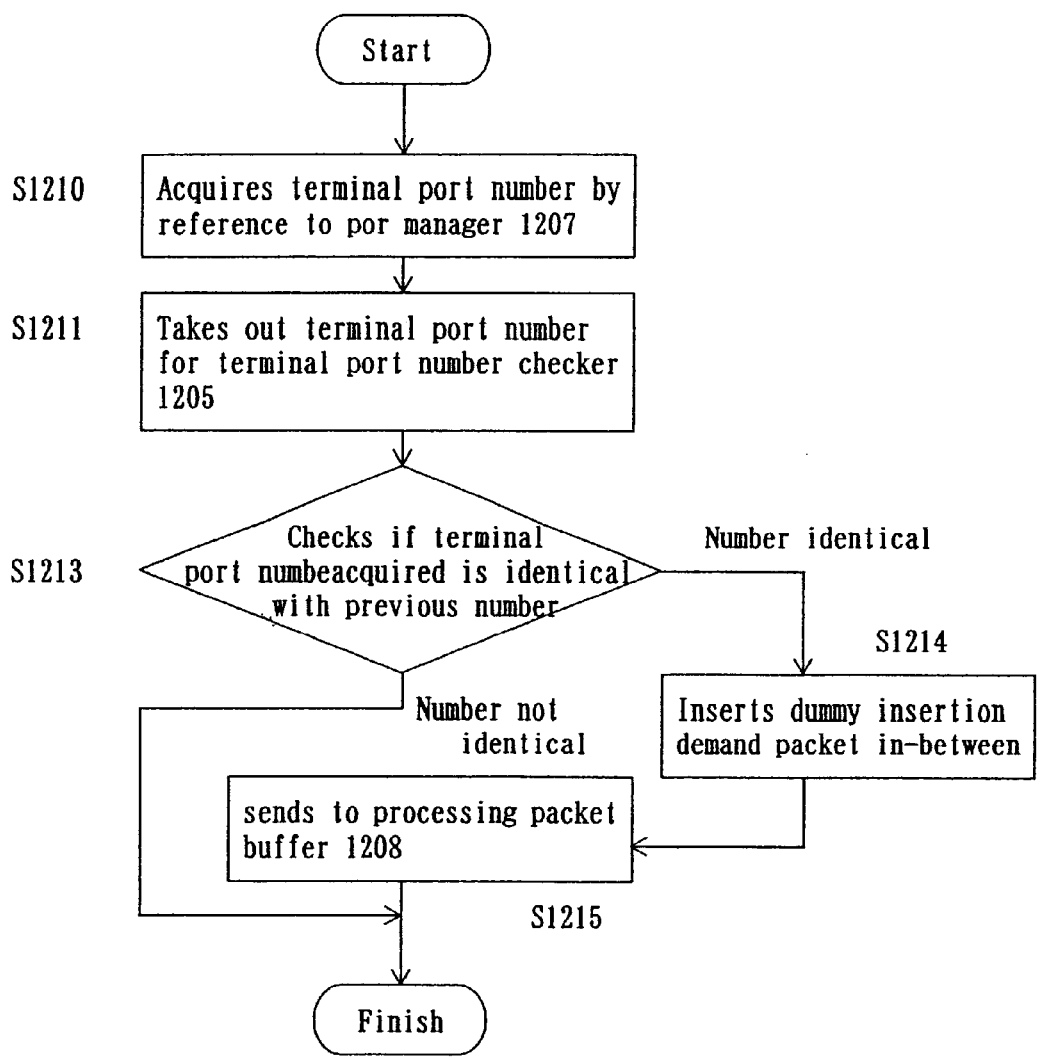
FIG. 7 is a flow chart showing another operating process of the embodiment in FIG. 5.
Figure 8:
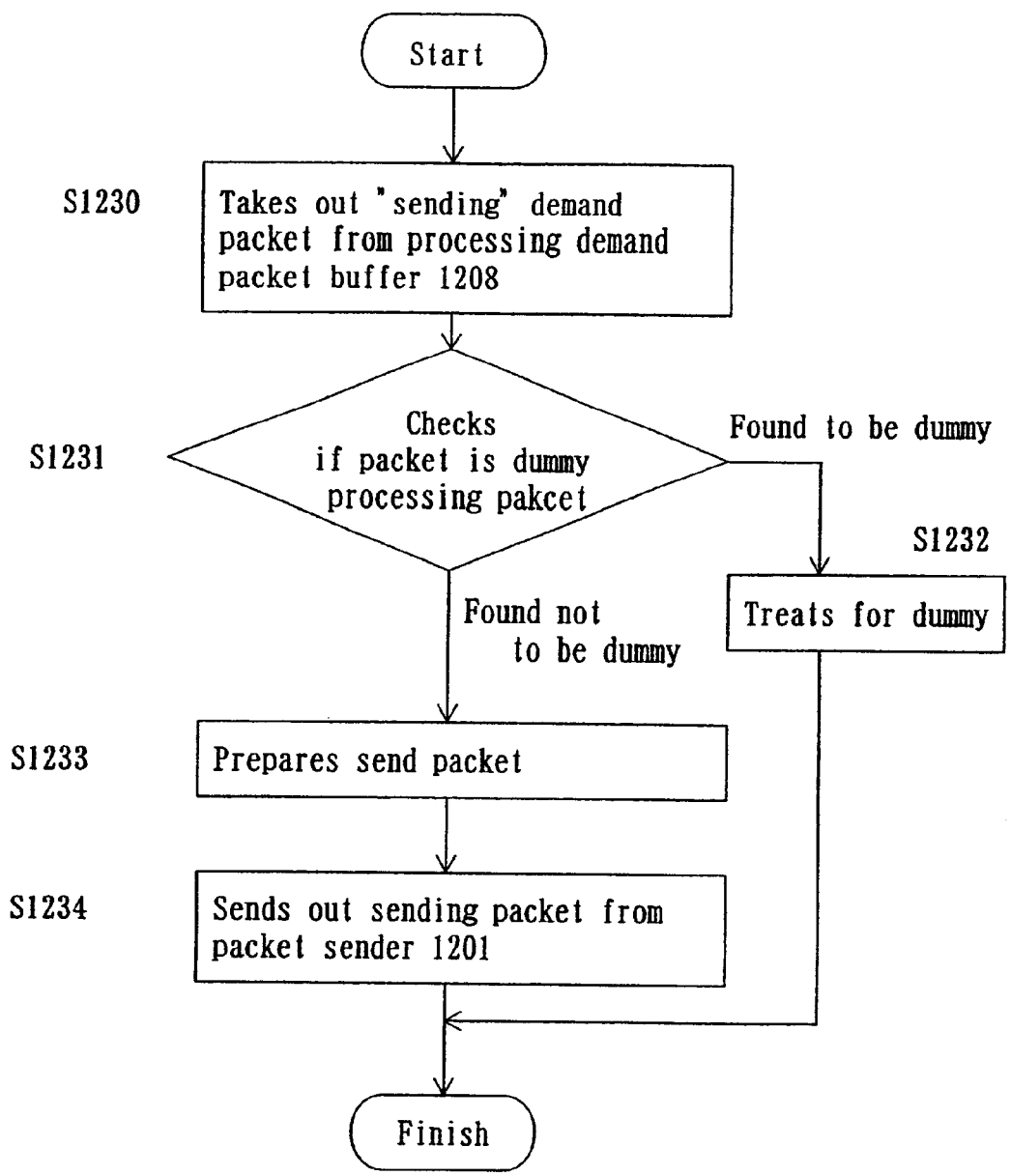
FIG. 8 is a flow chart showing still another operating process of the embodiment in FIG. 5.

FIGS. 6, 7 and 8 are flow charts showing the operating processes of the present embodiment. The configuration and operating processes of the server computers will be explained hereinafter in more detail with reference to FIGS. 5, 6, 7 and 8.

The description is omitted of the process (FIG. 6, Step S 1201–S 1202–S 1203) in which a data processing demand packet Pd0 as shown in FIG. 4(a) is received from any of the terminal computers 12-1 to 12-5 and the deciphered results are inputted in the data processing means 200, because the process is the same as that illustrated in Embodiment 1 (FIG. 2, Step S 1101–S 1102–S 1103).

The data processing means 200 generates "sending" demand packets Ps0 as shown in FIG. 4(b) on the basis of the data processing demand packets Pd0 received from the packet processor 1202 and stores the same in the processing demand packet buffer 1208 one by one (FIG. 6, Step S 1204) and also activates the data reading out means 700(k) to read out the demanded data.

Meanwhile, the timer 1210 in the port managing means 300 activates the terminal port number acquisition 1204 also in the port managing means 300 at a specified time interval, whereby the terminal port number acquisition 1204 takes in the "sending" demand packet Ps0 stored in the processing demand packet buffer 1208 and, by reference to the address information (1) of the destination address for one of the terminal computers 12-1 to 12-5 given in the "sending" demand packet Ps0, acquires a port number (n) of the terminal port on the switching hub stored in the port number controller 1207, the port number that matches the address information (1).

The timer 1210 is set for longer than the time for the data processing means 200 to process a data processing demand packet Pd0 (100 times as long, for example), and while there is a possibility that a plurality of processing demand packet packets Pd0 are stored in the processing demand packet buffer 1208, at the same time, the acquisition of terminal port numbers is effected for the plurality of "sending" demand packets Ps0 as a whole.

The terminal port number (n) thus acquired is written in a specific terminal port number section (9) on the "sending" demand packet Ps0, and at the same time the "sending" demand packet Ps0 with the terminal port number (n) written therein is written in the processing demand packet buffer 1208 again, and then the terminal port number checking means 400 is activated.

The terminal port number checker 1205 forming the terminal port number checking means 400 finds out the terminal port numbers on two consecutive "sending" demand packets Ps0 where the terminal port numbers are written as indicated above, and judges if the terminal port numbers on the switching hub 13 are identical (FIG. 7, Step S 1211). This process is repeated in case more than two "sending" demand packets Ps0 are stored. If the two numbers are found to be identical, then there will be activated the dummy inserter 1209 as the output regulating means 500, which reads out the two "sending" demand packets Ps0 from the processing demand packet buffer 1208, inserts a dummy insertion demand packet between the two "sending" demand packets Ps0 and stores them again in the processing demand packet buffer 1208 (FIG. 7, Step S 1213–S 1214–S 1215).

The terminal port number checking means 400 activates the dummy inserter 1209 as necessary when the comparison is finished, and then activates the sending packet processor 1206 in the sending means 600(k). As shown in FIG. 8, the sending packet processor 1206 collectively takes out the "sending" demand packet Ps0 and the dummy insertion demand packet stored in the processing demand packet buffer 1208, and prepares a header for the sending data packet on the basis of each "sending" demand packet Ps0 in the same way as the prior art and then forms sending data packets incorporating data obtained from the data reading out means 700(k) one after another, and hands them over to the packet sender 1213 which sends them out on the network (FIG. 8, Step S 1230–S 1231–S 1233–S 1234). And for a dummy insertion demand packet, a dummy insertion is effected (FIG. 8, Step S 1232).

Various forms of dummy insertion are possible. It is possible, for example, to select a terminal computer 12 or the server computer 11 connected to a port other than the one to which the processing demanding party terminal computer 12 and to send out a group of dummy data to that port. As a dummy data, a null data packet, for example, can be formed in the sending packet processor 1208.

In case there is a continuous flow of groups of sending data packets to one and the same terminal port P(n) on the switching hub to which the terminal computers are connected, dummy insertion will be effected therebetween, excluding the possibility of a large volume of data packets rushing to one port P(n) at a time. Thus, complete delivery of data to the respective terminal computers is ensured.

Embodiment 3

Figure 9:
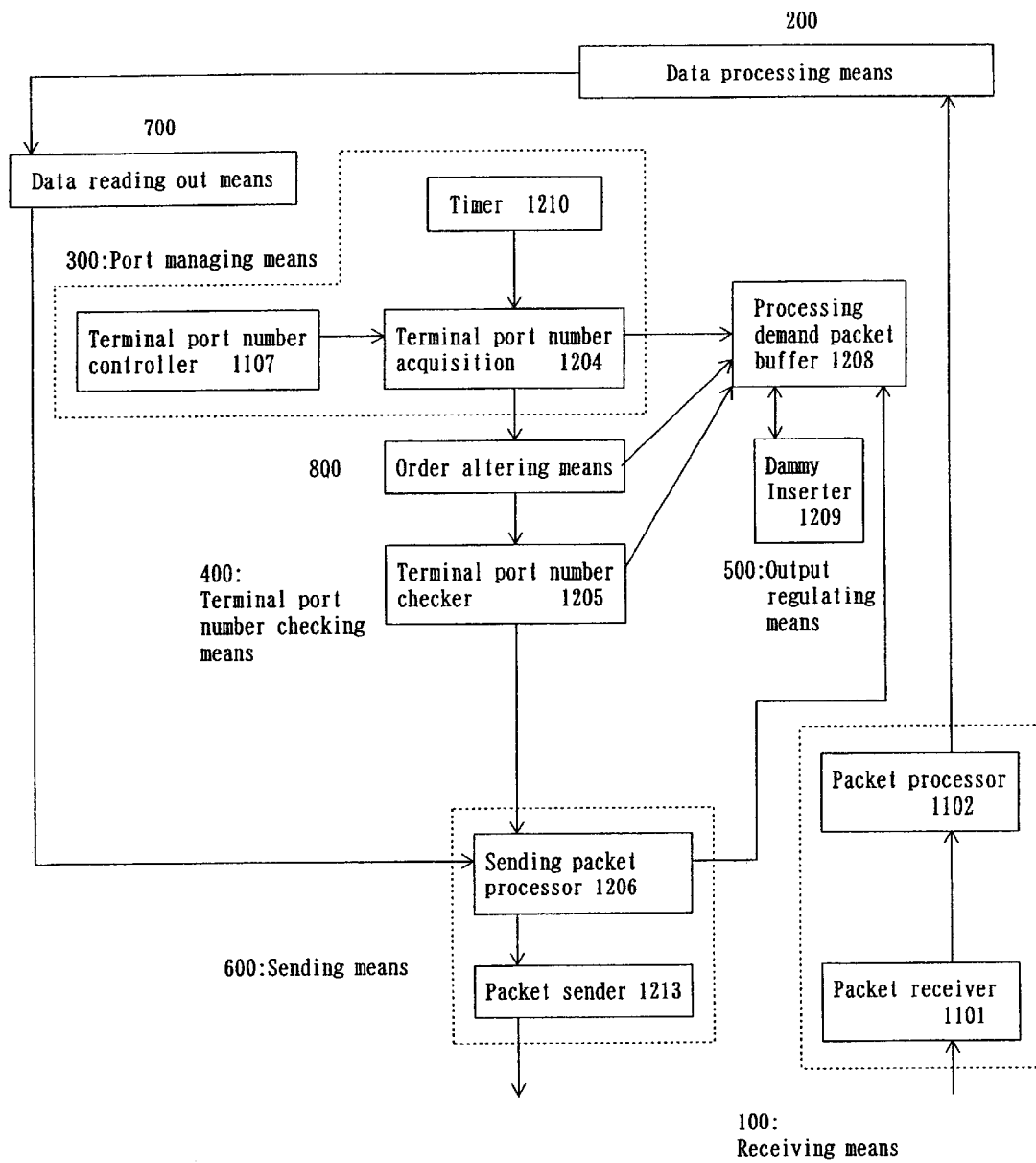
FIG. 9 is a functional block diagram showing a further embodiment of the present invention.

FIG. 9 is a functional block diagram showing a third embodiment of the present invention.

The present embodiment will be explained using the same reference numbers as in FIG. 1, but no description will be made of the configuration and function of the receiving means 100 (packet receiver 1101 and the packet processor 1102) in the server computer 11 and the data processing means 200, which are not different from those in Embodiment 1. Also, the configuration and function of the port managing means 300 are the same as those in Embodiment 2, and the description thereof will be omitted here. The reference numbers in FIG. 5 are used.

In the present embodiment, an order altering means 800 is provided that changes the order of the "sending" demand packets Ps0 on the basis of the terminal port numbers acquired by the terminal port number acquisition 1204 so that one terminal port number (n) will not come out successively. The "sending" demand packets Ps0 of which the order is changed that way are checked by the terminal port number checker 1205 (with the same function as in Embodiment 2) forming the terminal port number checking means 400 to see if the destination terminal ports of the consecutive "sending" demand packets Ps0 are the same.

There will not be explained the configuration and operation of the dummy inserter 1209 as output regulating means 500 and sending means 600(k) (sending packet processor 1206 and packet sender 1213) because they are identical with those in Embodiment 2, but the same reference numbers will be used in describing the present embodiment.

Figure 10:
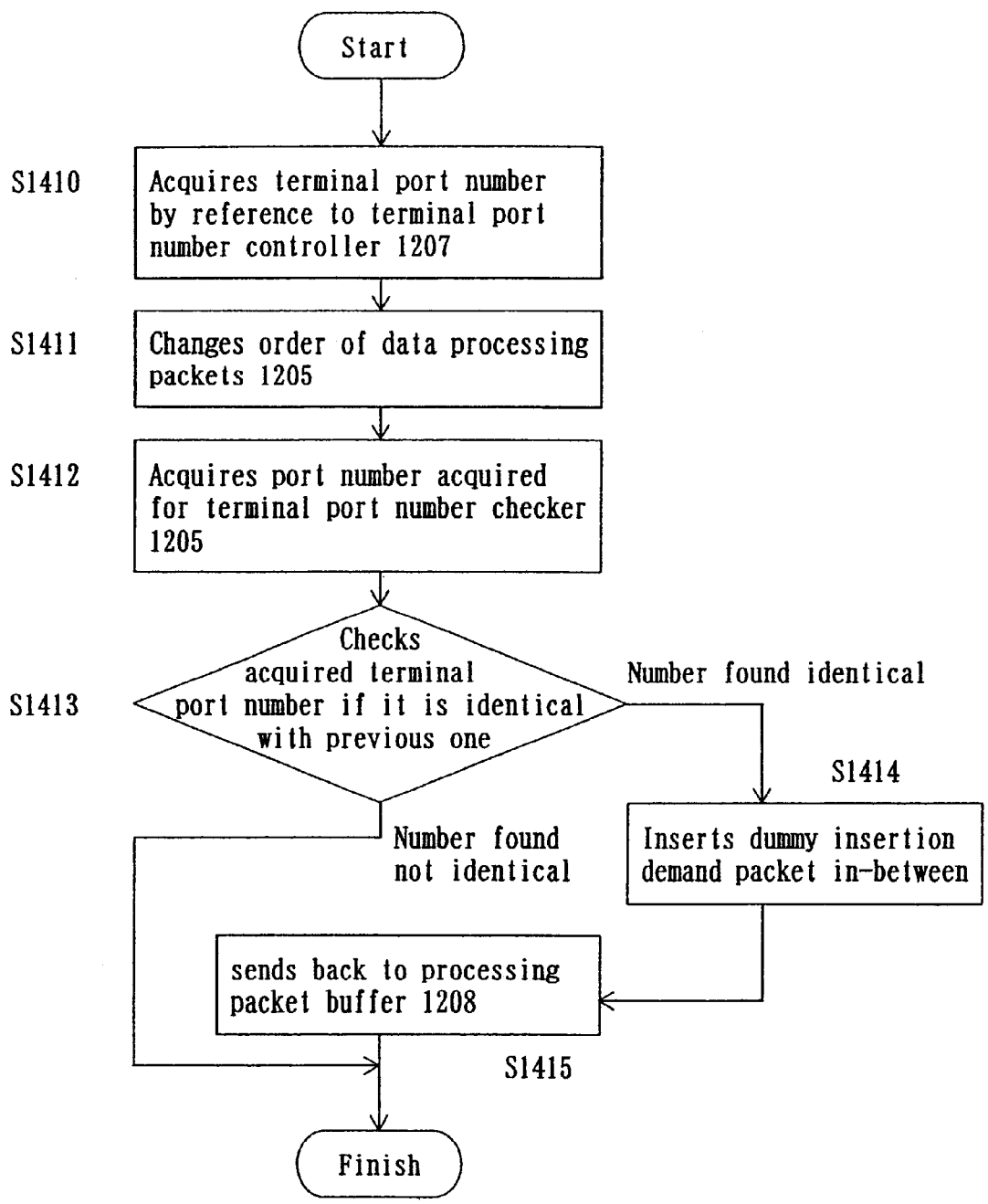
FIG. 10 is a flow chart showing the operating process of the embodiment in FIG. 9.

FIG. 10 is a flow chart showing the operating process of the present embodiment. Now, the configuration and operating process of the server computer will be explained in more detail referring to FIG. 9 and FIG. 10.

The description and drawing are omitted of the process in which a data processing demand packet Pd0 is received from any of the terminal computers 12-1 to 12-5 and the deciphered results are inputted in the data processing means 200, because the process is the same as in Embodiment 1.

The present embodiment is also the same as Embodiment 2 in the process that the data processing means 200 generates a "sending" demand packet Ps0 as shown in FIG. 4(*b*) and stores the "sending" demand packets Ps0 one after another in the processing demand packet buffer 1208 and activates the data reading out means 700(k) in the card 130 to read out the demanded data.

Also the same as in Embodiment 2 is the process that the terminal port number acquisition 1204 in the port managing means 300 is activated by the timer 1210 at a specified time interval, whereby the terminal port number acquisition 1204 acquires, from the terminal port number controller, the terminal port number (n) matching the address information (1) written in the "sending" demand packet Ps0 by reference to the address information (1).

Furthermore, the following process is identical with that in Embodiment 2: the acquired terminal port number (n) is written in the terminal port number section (9) of the "sending" demand packet Ps0 and stored again in the processing demand packet buffer 1208 (FIG. 101 step S 1410, FIG. 7 step S 1210).

In the present embodiment, the order of the "sending" demand packets Ps0 in which the port numbers thus acquired are written is changed before terminal port number checking. In other words, "sending" demand packets Ps0 stored in the processing demand packet buffer 1208 with the terminal port numbers written therein are taken in by the order altering means 800 where the order of "sending" demand packets Ps0 is changed according to a specified rule so that one terminal port number (n) will not come out successively as far as possible (FIG. 10, Step 1411). For example, the order of the "sending" demand packets Ps0 is so changed as to match the arrangement order of the terminal ports P on the switching hub 13 as far as possible. The "sending" demand packets Ps0 thus changed in order are written again in the processing demand packet buffer 1208, with the terminal port number checker 1205 in the terminal port number checking means 400 activated.

As shown in Embodiment 2, the checker 1205 finds out the terminal port numbers of two consecutive "sending" demand packets Ps0 from the processing demandpacket buffer 1208 and checks if the acquired numbers of terminal ports on the switching hub 13 are identical. If the two numbers are found to be identical, then the dummy inserter 1209 as the output regulating means 500 will be activated to read out the two "sending" demand packets Ps0 from the processing demand packet buffer 1208, inserts a dummy insertion demand packet between the two tsending demand packets Ps0 and stores them in the processing demand packet buffer 1208 again (FIG. 10, Step S 1413–S 1214–S 1415).

That is followed by the same process as Embodiment 2 that the sending means 600(k) is activated to form and send out a sending data packet and a dummy. The description and drawing presentation of that part are omitted.

According to the present embodiment as shown, the order of "sending" demand packets Ps0 is so changed that they will not be consecutive as far as possible. If packets for one terminal port still continue to come out successively, a dummy insertion demand packet will be inserted between the two consecutive "sending" demand packets Ps0, thus excluding the possibility of a large volume of data packets being concentrated in a certain port P(n) while the sending-out of dummy packets from the server computer is kept to a minimum.

Embodiment 4

Figure 11:
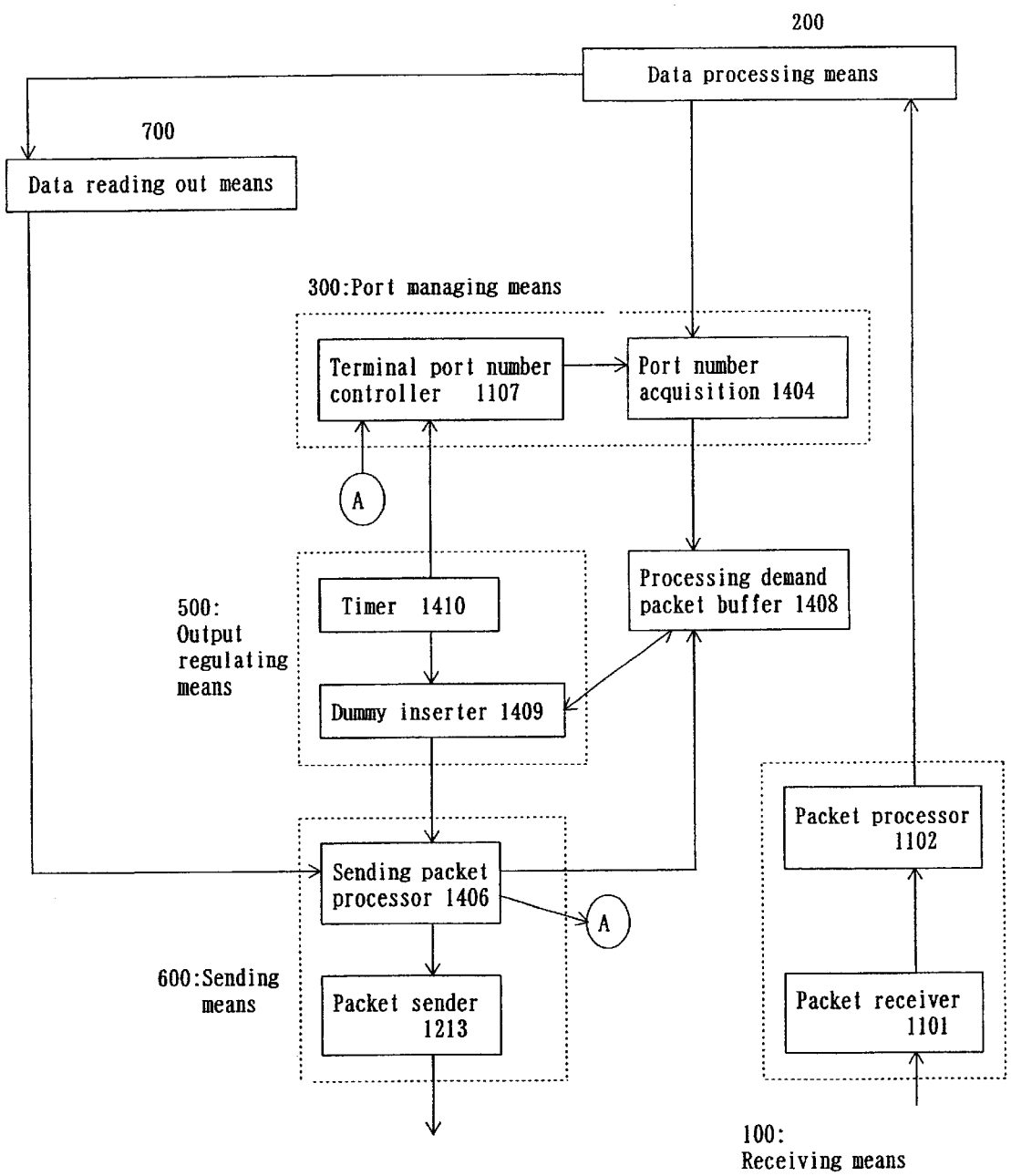
FIG. 11 is a functional block diagram showing still another embodiment of the present invention.
Figure 12:
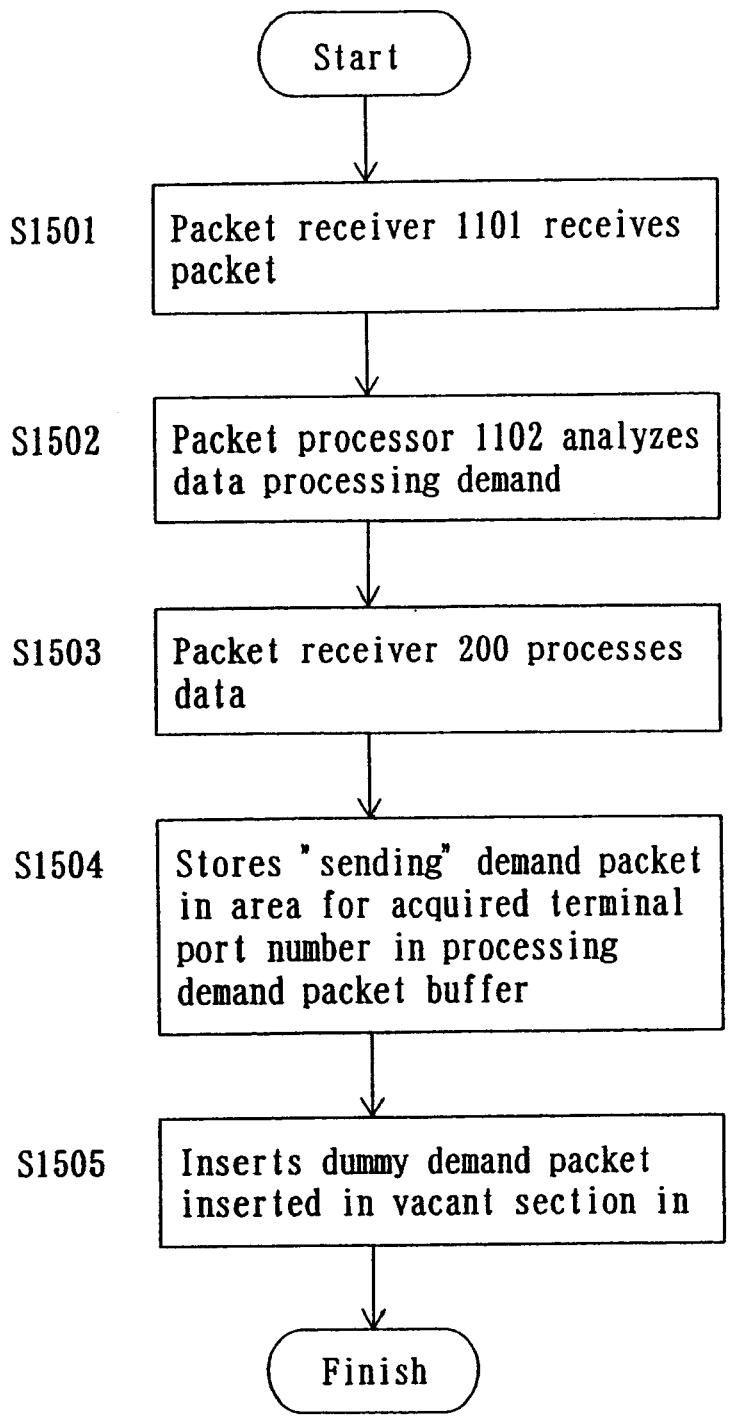
FIG. 12 is a flow chart showing the operating process of the embodiment in FIG. 11.

FIG. 11 is a functional block diagram of a fourth embodiment of the present invention, while FIG. 12 is a flow chart showing the operating process of the present embodiment. The configuration and the operating process of the server computer will be described hereinafter with reference to FIG. 11 and FIG. 12.

There will be no description or presentation with drawings of the process from the receiving of data processing demand packets Pd0 from any of the terminal computers 12-1 to 12-5 to the inputting of the deciphered results in the data processing means 200, which is identical with that in Embodiment 1 (FIG. 12, Step 1501–S 1502–S 1503).

The present embodiment is again the same as Embodiment 2 in the process that the data processing means 200 generates and forwards the "sending" demand packet Ps0 to the next step or the terminal port number acquisition means 1404, and activates the data reading out means 700(k) in the card 130(k) to read out the demanded data.

Also common between the present embodiment and Embodiment 1 is the process that when the "sending" demand packet Ps0 is inputted from the data processing means 200, the terminal port number acquisition 1404 in the port managing means 300 acquires, from the terminal port number controller, 1107, the terminal port number (n) matching the address information (1) given in the "sending" demand packet Ps0 by reference to the address information (1). and writes the terminal port number (n) in the terminal port number storage section (9) in the "sending" demand packet Ps0.

In the present embodiment, the "sending" demand packet Ps0 with the terminal port number (n) written therein is stored in the specific section in the processing demand packet buffer 1408 by the terminal port number acquisition 1404. That is to say, the processing demand packet buffer 1408 in the present embodiment is so configured that an area is provided for each terminal port number (n). And then, "sending" demand packet Ps0 are stored one after another in the respective areas for the respective terminal port numbers written by the terminal port number acquisition 1404 (FIG. 12, Step S 1504).

The operation of storing the "sending" demand packets Ps0 will be now explained with reference to FIG. 13.

Figure 13:
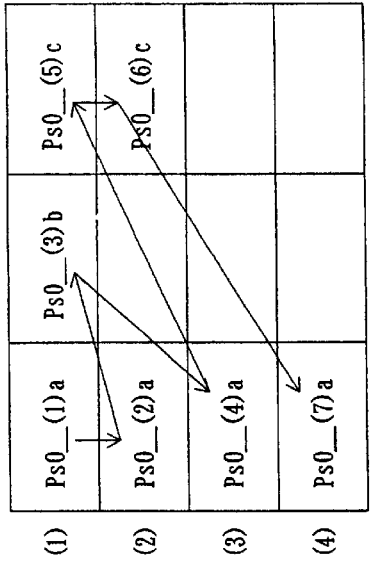
FIG. 13 is a conceptional diagram showing the processing demand packet buffer of the embodiment in FIG. 11.

FIG. 13(*a*) is a conceptional diagram showing the processing demand packet buffer 1408 in which, it is assumed, the destination terminal ports P(n) are port P(a), port(b) and port P(c). As shown in the figure, the processing demand packet buffer 1408 is arranged in a matrix form with the destination terminal port numbers (a), (b) and (c) indicated on the upper side and the order of inputting the "sending" demand packets Ps0 given on the left side. (In the description, the section determined by a row and a column, row (1) and column (a) for example, is referred to as "section (1) (a).") The "sending" demand packets Ps0 are to be stored in the inputting order of (1)–(2)–(3)–(4) in the columns allocated for the respective written terminal portnumbers.

To illustrate, consecutive 7 "sending" demand packets with the written terminal port numbers of "(a), (a), (b), (a), (c), (c), (a)", for example, are referred to as ⌈Ps0_1(a)⌋, ⌈Ps0_2(a)⌋, ⌈Ps0_3(b)⌋, ⌈Ps0_4(a)⌋, ⌈Ps0_5(c)⌋, ⌈Ps0_6(c)⌋, ⌈Ps0_7 (a)⌋ respectively, and those 7 consecutive "sending" demand packets Ps0 will be stored in the sections shown in FIG. 13(*b*) in the order indicated by arrows. In order words, the "sending" demand packet Ps0_1(a) is first stored in section (1)(a), then the "sending" demand packet Ps0_2(a) in the next column or section (2)(a), then the "sending" demand packet Ps0_3(b) of which the send destination terminal port number (n) is (b) goes to section (1)(b). This way, all the packets up to Ps0_7(a) are stored one after another.

The output regulating means 500 in the present embodiment is composed of a dummy inserter 1409 and a timer 1410 to activate the dummy inserter 1409 at a specific time interval. The function of the dummy inserter 1409 and the timer 1410 is the same as in Embodiment 3.

When the timer 1410 runs out, the terminal port number acquisition 1404 stops writing in the processing demand packet buffer 1408 and then the dummy inserter 1409 turns to the processing demand packet buffer 1408 and inserts the dummy insertion demand packet in a vacant section. That is to say, after the 7 consecutive processing demand packets Pd0 are stored in the processing demand packet buffer 1408, the following sections are left vacant: sections (2)(b), (3)(b), (4)(b), (3)(c) and (4)(c). And the dummy inserter 1409 inserts in those vacant areas the dummy insertion demand packets as shown in FIG. 13(*c*) (in the figure, indicated in P dummy_1, P dummy_2. P dummy_3, P dummy_4, P dummy_5).

When the insertion of dummies is over, the dummy inserter 1409 activates the sending packet processor 1406 in the sending means 600(k). The sending packet processor 1406 takes out the "sending" demand packets Ps0 and dummy insertion demand packets stored in the processing packet buffer 1408 one by one in order of terminal port numbers as shown in FIG. 13(*d*). In other words, the dummy inserter 1409 takes out the "sending" demand packets Ps0 or dummy insertion demand packets in this order: "Ps0_1(a)-Ps0_3(b)-Ps0_5(c)-Ps0_2(a)-P dummy_1-Ps0_6(c)-Ps0_4(a)-P dummy_2-P dummy_3-Ps0_7(a)-P dummy_4-P dummy_5." Taking out the "sending" demand packets Ps0 and dummy insertion packets that way can prevent "sending" demand packet Ps0 with one and the same terminal port number (n) from coming out successively.

The subsequent process is identical with that in Embodiment 3 from the formation of sending data packets and dummy packets by the sending packet processor 1406 to the sending out by the packet sender 1213 of the sending data packets. The description and drawing presentation thereof are omitted.

In the present embodiment, as is described, the output adjustment is effected only with dummies inserted as necessary, and the terminal port number checking means 400 is not provided, and thus the processing load of CPU can be reduced.

It is noted that the time for the terminal port number acquisition 1404 to start writing in the processing demand packet buffer 1408 is not restricted. It can be when the timer 1410 runs out next time or when the sending packet processor 1406 finishes taking out the "sending" demand packets Ps0 and dummy insertion demand packets.

It also goes without saying that the sending out of data described in the foregoing embodiments can be effected using storage media as, for example, an optical disk with the process of sending out data incorporated as program.

As has been explained, the present invention adjusts the time of outputting groups of sending data packets when groups of sending data packets to terminal computers rush to one and the same terminal port on the switching hub, thus precluding the possibility that while a unit of sending data packets are still being processed, another group of sending data packets will be inputted with the part of the data beyond the buffer capacity cut off.

While delaying the time of sending out the subsequent data packets or inserting a dummy packet between the sending data packets can be a means for adjusting the time of outputting groups of sending data packets, the object of the present can be achieved more effectively if the order of sending out data packets with a dummy to be inserted therebetween is so adjusted that the destinations of the sending data packets may not be concentrated at one and the same port as far as possible.

What is claimed is:

1. A method of sending out data from a server computer to a terminal computer seeking said data, said server computer configured for receiving a data processing demand sent in from any of a plurality of terminal computers on a network by way of a specific terminal port on a switching hub, forming a group of sending data packets on said data processing demand, and then sending out said group of data packets via said specific terminal port to said terminal computer that sent in said data processing demand, said method, performed by the server computer, comprising the steps of:

the step of determining, on the basis of the contents of said data processing demand, the number of the terminal port on said switching hub to which the terminal computer, the destination of said sending data packets, is connected, the step of checking consecutive sending data packets formed according to successively received data processing demand to determine if the terminal port numbers thus determined are the same, and the output regulating step of adjusting the time of sending out groups of sending data packets on said data processing demand in case said checking determines the use of the same terminal port number repeats successively.

2. The method of sending out data from a server computer according to claim 1, wherein said output regulating step regulates the time interval of sending out groups of sending data packets.

3. The method of sending out data from a server computer according to claim 1, wherein said output regulating step inserts a dummy packet between two consecutive groups of sending data packets.

4. The method of sending out data from a server computer according to claim 3, wherein, with regard to the terminal port numbers determined in said step of determining a terminal port number, the order of sending out sending data packets is changed according to a specified rule so that the same terminal port number will not repeat successively as far as possible prior to conducting said terminal port number checking.

5. The method of sending out data from a server computer according to in claim 3, wherein said dummy packet is sent out to a terminal port other than the one to which the terminal computer making said data processing demand is connected.

6. A computer readable medium bearing instructions for sending out data from a server computer to a terminal computer seeking said data, said instructions being arranged to cause one or more processors upon execution thereof to perform the steps of:

the step of determining, on the basis of the contents of said data processing demand, the number of the terminal port on said switching hub to which the terminal computer, the destination of said sending data packets, is connected, the step of checking consecutive sending data packets formed according to successively received data processing demand to determine if the terminal port numbers thus determined are the same, and the output regulating step of adjusting the time of sending out groups of sending data packets on said data processing demand in case said checking determines the use of the same terminal port number repeats successively.

7. A server computer configured for receiving data processing demand packets sent in from any of a plurality of terminal computers on a network by way of a specific terminal port on a switching hub, forming a group of sending data packets for said data processing demand packets and then sending out said group of data packets via said specific terminal port to said terminal computer that sent in said data processing demand, comprising:

a port managing means for determining, from the contents of said data processing demand packet, the number of the terminal port on said switching hub to which a terminal computer for receiving said sending data packets is connected, a terminal port number checking means for checking consecutive sending data packets formed according to successively received data processing demands to see if the terminal port numbers determined by said port managing means are the same, and an output regulating means for adjusting the time of sending out groups of sending data packets for said data processing demand packets when said terminal port number checking means determines that use of the same terminal port number repeats successively.

8. The server computer according to claim 7, wherein said output regulating means is a timer to control the time interval of sending out groups of sending data packets.

9. The server computer according to claim 7, wherein said output regulating means is a dummy inserter to insert a dummy packet between two consecutive groups of sending data packets.

10. The server computer according to claim 9, further comprising:

an altering changing means configured for changing the order of sending out sending data packets according to a specified rule with regard to the port numbers found out by said port managing means so that the port numbers for successive groups of sending data packets may not be the same as far as possible prior to activation of said terminal port number checking means.

11. The server computer according to claim 9, wherein said dummy inserter gives to the dummy packet an address for a terminal port to which the sender of said data processing demand, the terminal computer, is not connected.

12. Said server computer for receiving said data processing demand packet and preparing "sending" demand packets at a data processing means and forming sending data packets on the basis of said "sending" demand packets at a sending means according to claim 9, wherein said dummy inserter inserts a dummy insertion packet between consecutive "sending" demand packets indicating the same terminal port number.

13. Said server computer for receiving said data processing demand packet and preparing a "sending" demand packet at a data processing means and forming a group of sending data packets on the basis of said "sending" demand packets at a sending means according to claim 7, wherein said "sending" demand packet is so provided with an area for storing the port number that said "sending" demand packet, with said port number found out by the said port managing means written in said port number storing area, is made the carrier of the terminal port number.

* * * * *